(12) United States Patent
Dean

(10) Patent No.: US 9,075,749 B2
(45) Date of Patent: Jul. 7, 2015

(54) DISCRETE FOURIER TRANSFORM IN A COMPLEX VECTOR SPACE

(75) Inventor: Bruce H. Dean, New Market, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1104 days.

(21) Appl. No.: 13/043,257

(22) Filed: Mar. 8, 2011

(65) Prior Publication Data

US 2012/0109559 A1 May 3, 2012

Related U.S. Application Data

(60) Provisional application No. 61/311,909, filed on Mar. 9, 2010.

(51) Int. Cl.
*G06F 19/00* (2011.01)
*G06F 17/14* (2006.01)

(52) U.S. Cl.
CPC ................................. *G06F 17/141* (2013.01)

(58) Field of Classification Search
USPC .................. 702/72, 73, 77, 191, 196; 700/59; 382/210, 276, 280
See application file for complete search history.

(56) References Cited

U.S. PATENT DOCUMENTS

| 4,924,229 | A  | * | 5/1990  | Eichel et al. | ................. | 342/25 E |
| 6,304,325 | B1 | * | 10/2001 | Hardy et al.  | .................. | 356/450 |
| 2004/0062453 | A1 | * | 4/2004  | Ludwig       | .......................... | 382/280 |
| 2010/0002950 | A1 | * | 1/2010  | Arieli et al. | .................... | 382/255 |
| 2010/0223697 | A1 | * | 9/2010  | Moeck        | ........................... | 850/19 |

* cited by examiner

*Primary Examiner* — Mohamed Charioui

(57) ABSTRACT

An image-based phase retrieval technique has been developed that can be used on board a space based iterative transformation system. Image-based wavefront sensing is computationally demanding due to the floating-point nature of the process. The discrete Fourier transform (DFT) calculation is presented in "diagonal" form. By diagonal we mean that a transformation of basis is introduced by an application of the similarity transform of linear algebra. The current method exploits the diagonal structure of the DFT in a special way, particularly when parts of the calculation do not have to be repeated at each iteration to converge to an acceptable solution in order to focus an image.

8 Claims, 3 Drawing Sheets

DISCRETE FOURIER TRANSFORM IN A COMPLEX VECTOR SPACE

PRIORITY CLAIM

This application claims priority under 35 U.S.C. §119 to U.S. Provisional Application Ser. No. 61/311,909 entitled "DISCRETE FOURIER TRANSFORM IN A COMPLEX VECTOR SPACE" filed on Mar. 9, 2010, the entire contents of which are hereby incorporated by reference.

ORIGIN OF THE INVENTION

The invention described herein was made by an employee of the United States Government, and may be manufactured and used by or for the Government for governmental purposes without the payment of any royalties thereon or therefore.

BACKGROUND OF THE INVENTION

1. Field of the Invention

This application relates to Discrete Fourier Transforms, and in particular, to Discrete Fourier Transforms in phase retrieval for use in waveform analysis.

2. Background

Phase retrieval is an image-based wavefront sensing method that utilizes point-source images (or other known objects) to recover optical phase information. The most famous application of phase retrieval was the diagnosis of the Hubble Space Telescope mirror edge defect discovered soon after the launch of Hubble and subsequent correction using Corrective Optics Space Telescope Axial Replacement (COSTAR.) It may be ironic that a phase retrieval wavefront-sensing method lies at the very heart of the commissioning process for Hubble's successor. The earliest suggestion of using phase retrieval as a wavefront sensing method for JWST was in 1989, nearly a year before the Hubble launch and deployment. Details documenting the Hubble Space Telescope phase retrieval analysis are discussed in the literature.

A number of image-based phase retrieval techniques have been developed that can be classified into two general categories, the (a) iterative-transform and (b) parametric methods. Modifications to the original iterative-transform approach have been based on the introduction of a defocus diversity function or on the input-output method. Various implementations of the focus-diverse iterative-transform method have appeared which deviate slightly by utilizing a single wavelength or by varying the placement and number of defocused image planes. Modifications to the parametric approach include minimizing alternative merit functions as well as implementing a variety of nonlinear optimization methods such as Levenburg-Marquardt, simplex, and quasi-Newton techniques. The concept behind an optical diversity function is to modulate a point source image in a controlled way; in principle, any known aberration can serve as a diversity function, but defocus is often the simplest to implement and exhibits no angular dependence as a function of the pupil coordinates The discrete Fourier transform (DFT) calculation is presented in "diagonal" form. By diagonal we mean that a transformation of basis is introduced by an application of the similarity transform of linear algebra.

What is needed is to find a more efficient implementation of the DFT for applications using iterative transform methods, particularly phase retrieval.

BRIEF SUMMARY

The image-based wavefront sensing method of and apparatus for focusing by determining phase difference between received images, removing that phase difference by calculating a DFT for each signal and iteratively multiplying the resultant until a convergence is achieved comprises the steps of accepting point-source stellar objects to recover embedded optical phase information, receiving data from a sensor array wherein the data includes embedded phase information, calculating a similarity transform and pre-transforming the data once at the beginning of the calculation.

The image-based wavefront sensing method of and apparatus for further includes iteratively processing the data using arbitrary frequency spacing in a diagonal fashion until a wavefront convergence is achieved to determine a phase difference by implementing the DFT in a 1 dimensional linear array using just N operations, where $0 < N < N \times \log(N) < \infty$, wherein $N \times \log(N)$ is the number of operations of an FFT counterpart, back-transforming the data at the end of the calculation in a single step and focusing the received images based on the determined phase.

The general problem of diagonalizing the DFT matrix (DFT eigen-problem) has been around for years. Apparently some aspects of the problem are related to topics in number theory that were even solved by Gauss. Such considerations have not led to more efficient implementations of the DFT over the FFT implementation, but we note that for certain applications, e.g., phase retrieval, that it is possible to exploit the diagonal structure of the DFT in a special way, particularly when parts of the calculation do not have to be repeated at each iteration to converge to an acceptable solution.

DETAILED DESCRIPTION

Figure 1:
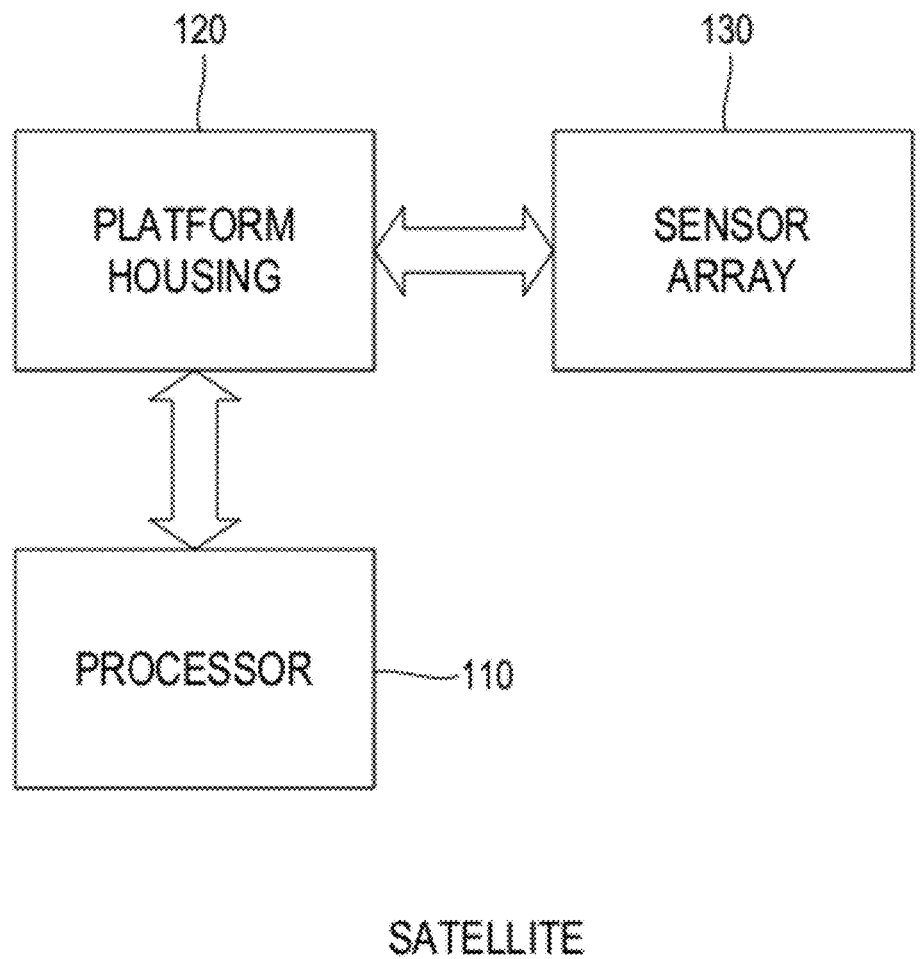
FIG. 1 is a functional block diagram of a system which contains a discrete Fourier transform processor in a complex vector space, according to an example embodiment.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, example embodiments will be described with reference to the attached drawings.

Example embodiments of the present invention include a Discrete Fourier Transform (DFT) in phase retrieval for use in waveform analysis in a space based application.

One such space based application under consideration to use DFT phase retrieval methods includes the James Webb Space Telescope (JWST), one of NASA's great observatories of the Origins program and is scheduled to launch later this decade. The JWST design includes using advanced optical technology and O-30 grade beryllium mirrors. The primary mirror is a 6.5 meter segmented primary using 18 segments in a hexagonal array. The optical design and manufacturing tolerances are specified for diffraction-limited performance at 2 μm, and the telescope is designed for operation over a temperature range of 30-60 K with an areal density of less than 15 kg/m². As a result, JWST commissioning and periodic optical maintenance incorporate san image-based wavefront sensing and control (WFSC) system to align the mirror segments, minimize the effects of figure error, and position the secondary mirror of the three-mirror anastigmat design. The wavefront sensing method specified for JWST is image-based in the sense that point-source stellar images are collected and processed to recover optical phase information. The primary camera for this function is the JWST Near Infrared Camera (NIRCam), although it has been shown that the Near Infrared Spectrograph (NIRSpec) is suitable for this function as well.

FIG. 1 shows a block diagram of a satellite or platform in which an embodiment of the instant invention is contained. The sensor array 130 is connected both physically and electronically to the platform housing 120 which is in turn likewise connected the processor 110 which contains the primary embodiments of the instant invention. The platform housing includes all the necessary parts (not shown) of a satellite such as fuel, electrical power, communications etc. Image-based wavefront sensing is computationally demanding due to the floating-point nature of the process. With certain data configurations and large array sizes, and particularly for undersampled data sets, the calculations can take tens of minutes or even hours to reach full convergence for the optical wavefront. In addition, processors are generally susceptible to opto-mechanical instabilities induced by environmental factors such as jitter and turbulence. These factors not only limit fine-phasing performance but also the stability of the phasing results. In such cases, an obvious mitigation strategy is to increase the computational bandwidth of the WFSC system, i.e., decrease the time required for an entire closed-loop WFSC cycle.

To improve convergence times without sacrificing accuracy and to mitigate these environmental factors, we have developed special-purpose floating-point intensive computing hardware. These processors communicate using a series of multi-processor computing architectures specifically tailored to the JWST fine-phasing methodology. The computing system is based on a cluster of 64 DSPs (digital signal processors) operating in parallel under a shared memory architecture. The system is portable and callable from a laptop computer using a typical Ethernet connection, reaching a sustained floating-point performance of approximately 100 Giga-Flops with 64 DSPs for development, testing and hardware redundancy.

An embodiment of the instant invention is illustrated by some practical aspects of calculating in a diagonal DFT basis. Aside from the application to iterative Fourier methods, calculating in the diagonal DFT basis also has an interesting geometrical interpretation as solving for the Fourier transform pair, $(F_n, f_n)$, that are co-linear or "parallel" with one another. Additional discussion on this interpretation is given below.

As an overview we begin by writing down the matrix form of the DFT. Next the hybrid-index notation of Schouten is introduced as an efficient notation for performing the DFT calculations in a complex vector space. The similarity transformation is presented in detail for a low-dimensional DFT example (4×4 array size) and then applied to illustrate how the DFT can be carried out in a diagonal basis using the hybrid-index notation. The main results show that by "pre-transforming" the data once at the beginning of the calculation, and then "back-transforming" the data at the end of the calculation, the DFT can potentially be implemented as a 1-d vector product using just N operations, compared to the N×log(N) operations needed by the FFT counterpart. The "pre-" and "back-" transforms are implemented using the DFT similarity transform and we further note that the calculation can be implemented using arbitrary frequency spacing.

DFT as a Unitary Transform

The DFT calculation can by implemented in matrix form:

$$F(v_m) \equiv DFT(v_m) = \Delta x \sum_{n=0}^{N-1} f(x_n) V_{mn}, \quad (1)$$

where $V_{mn}$ is a non-singular M×N Vandermonde array:

$$V_{mn} = e^{-i2\pi v_m(n\Delta x)} = e^{-i2\pi(m\cdot n)/M} = (e^{-i2\pi/M})^{m\cdot n} = \omega_M^{m\cdot n}, \quad (2)$$

with components given by $$V_{mn} = \begin{pmatrix} 1 & 1 & 1 & L & 1 \\ 1 & \omega_M & \omega_M^2 & L & \omega_M^{N-1} \\ 1 & \omega_M^2 & \omega_M^{2\cdot 2} & L & \omega_M^{2(N-1)} \\ M & M & M & O & M \\ 1 & \omega_M^{M-1} & \omega_M^{(M-1)\cdot 2} & L & \omega_M^{(M-1)(N-1)} \end{pmatrix}. \quad (3)$$

Next we define $W_{mn}$ as $$W_{mn} = V_{mn}/\sqrt{M} = (e^{-i2\pi/M})^{m\cdot n}/\sqrt{M}, \quad (4)$$

and then it is straightforward to show that $W_{mn}$ is a unitary matrix:

$$W \cdot W^\dagger = I, \quad (5)$$

using boldface matrix notation where I is the identity matrix and the "†" symbol denotes the complex-conjugate transpose or "adjoint." We comment that the adjoint operation will be presented more generally in the next Section. Next letting $$f_n \equiv \Delta x f(x_n), \qquad (6)$$

Equation (1) takes the form of a unitary transformation:

$$F(v_m) \equiv F_m = \sum_{n=0}^{N-1} W_{mn} f_n, \qquad (7)$$

with the inverse transformation given by (generally but not always we take M=N):

$$f_n = \sum_{m=0}^{M-1} (W_{mn})^\dagger F_m. \qquad (8)$$

Given (5) and (7), the DFT can be analyzed using the transformation theory of complex vector spaces. The hybrid-index notation of Schouten supplies a natural framework for this approach and is presented in the next Section.

Hybrid Index Notation

As illustrated above, the DFT is a unitary transformation in a complex vector space. Therefore, the calculations can be performed elegantly and efficiently using the tensor-transformation formalism of Schouten. In particular, Schouten's hybrid-index notation provides a natural framework for the DFT calculations. The goal in using this approach is to give a more general representation of the calculations by identifying components with quantities of a geometric manifold. Often, but not always, such identification can lead to alternative or more efficient calculation strategies as discussed later. Therefore, the goal in the next Section is to sort out the details of the hybrid-index notation for the DFT, and thus identify the DFT with quantities in a geometric manifold. In addition, by adopting a notation that makes the transformation rules of a quantity explicit, the meaning of the calculations can often be clarified and the notation serves as an efficient bookkeeping device for checking consistency throughout the calculations.

DFT in Hybrid-Index Notation

The DFT is defined here as a unitary transform between conjugate Fourier domains. The 1-d DFT transform is then expressed using Schouten's hybrid-index notation as $$F^m = W^m{}_{\cdot n} f^n, \qquad (9)$$

using the Einstein sum convention defined over repeated indices in an upper/lower combination:

$$\sum_n W_{mn} f_n \equiv W^m{}_{\cdot n} f^n. \qquad (10)$$

The lower/upper indices denote the covariant and contravariant transformation rules—the upper indices are not exponents in this notation. Exponents of a quantity will be denoted using parentheses, or brackets, respectively, for either a transformation of coordinates, or a "point transformation." Allowable transformations of coordinates for this application will be discussed later. The distinction between the transformations of coordinates and point transformations are fundamental to Schouten's kernel-index method. To elaborate briefly, coordinate transformations are denoted by a transformation of basis, say, m→m', where the new basis set is denoted by m'. The components in the new basis are thus $$u^{m'} = A_m{}^{m'} u_m, \qquad (11)$$

where $A_m{}^{M'}$ is the transformation matrix and the $u^m$ are the vector components in the new basis set (u is arbitrary).

A point transformation, on the other hand, is denoted by $$U^m = P_{\cdot n}{}^M u^n, \qquad (12)$$

and is the form adopted for the DFT in (9). Another important distinction between a transformations of basis and a point transformation is that the indices for the point transformation are ordered and the positions are marked using over- or under-dots as in $P_{\cdot n}{}^m$ (12). The main take-away is that for coordinate transformations, the kernel symbol, u, remains the same as in (11). But for point transformations, the kernel symbol changes (as in (12)) but the indices remain the same. So initially at least in this context, the DFT transformation in (9) is defined as a point transformation, but later we find that when calculating the DFT in a diagonal basis, it is natural to reconsider (9) using a common kernel symbol for the Fourier transform pair, specifically, $(F^m, f^n) \to (f_{\bar{m}}, f^n)$. We note also that it is possible to mix the two transformations (basis and point) as is required when considering the allowable transformations of basis in digital signal processing. These details will be discussed in more detail later.

Continuing with an explanation of the formalism, the complex conjugate of (9) is given by $$\overline{F^m} = \overline{W^m{}_{\cdot n}} \overline{f^n} = \overline{f^m}, \qquad (13)$$

using the over-bar to denote the complex conjugation of components and kernel symbols in accordance with Schouten's hybrid-index notation and noting for consistency that $$\overline{F^m} = \overline{f^m} \Rightarrow \overline{\overline{F^m}} = \overline{\overline{F^m}} = F^m. \qquad (14)$$

The conjugation of indices and kernel objects is fundamental to the study of transformations in a complex vector space, and as illustrated below, is perfectly suited for calculations of the DFT transform.

We choose an initial convention that the data values are labeled by contravariant components, $f^m$, and then by complex conjugation of the kernel symbol and indices in various combinations, several other types of components are represented in Schouten's notation by the "raising" and "lowering" of indices using the "fundamental" or metric tensor, $a_{\bar{k}l}$:

$$f^n, f_{\bar{m}}, \overline{f^n}, \overline{f}_m, \qquad (15)$$

where the latter two follow by complex conjugation of the first two. Specifically, we mean that $$f^n \Rightarrow f_{\bar{n}} = a_{\bar{m}n} f^n; \overline{f^n} \Rightarrow \overline{f}_m = a_{\bar{m}n} \overline{f^n}, \qquad (16)$$

As mentioned above, co- and contravariant transformation rules can be switched back and forth using the metric or fundamental tensor, $a_{\bar{k}l}$, to raise or lower indices as appropriate. The metric tensor also defines how the differential element of distance is calculated in the manifold as well as the inner product between two vectors, say, $u^k$ and $v^l$:

$$\langle u | v \rangle = a_{\bar{k}l} \overline{u^k} v^l = \overline{u}_l v^l = \overline{u^k} v_{\bar{k}}, \qquad (17)$$

pointing out that in a linear complex vector space, the "bra-ket" notation of Dirac is easily incorporated in this approach as illustrated on the LHS of (17). Illustrating the use of the metric for raising and lowering indices we have:

$$W_{\cdot n}{}^m = a_{\bar{l}n} W^{m\bar{l}} \text{ and } f^n = \overline{a}^{n\bar{k}} f_{\bar{k}}, \qquad (18)$$

and then substituting these expressions back into (9) we see that an alternative form of the DFT is obtained:

$$F^m = W_{\cdot n}{}^m f^n = (a_{\bar{l}n} W^{m\bar{l}})(\overline{a}^{n\bar{k}} f_{\bar{k}}) = a_{\bar{l}n} \overline{a}^{n\bar{k}} W^{m\bar{l}} f_{\bar{k}} = \delta_{\bar{l}}{}^{\bar{k}} W^{m\bar{l}} f_{\bar{k}} \Rightarrow F^m = W^{m\bar{n}} f_{\bar{n}}. \qquad (19)$$

Adjoint in a Geometric Manifold

In general, the adjoint operation applied to the $W_{\cdot n}{}^m$, denoted by $\tilde{W}_{\cdot n}{}^m = (W_{\cdot n}{}^m)^\dagger$, is defined through a two-step operation using both the metric tensor and complex conjugation:

(a) each index is raised or lowered as appropriate using the metric:

$$a_{\bar{n}k} a^{\bar{l}\bar{m}} W_{\cdot l}{}^k = W_{\bar{n}}{}^{\bar{m}}, \tag{20}$$

(b) the result in (a) is then complex conjugated to give $$(W_{\cdot n}{}^m)^\dagger = \overline{a_{\bar{n}k} a^{\bar{l}\bar{m}} W_{\cdot l}{}^k} = \overline{W_{\bar{n}}{}^{\bar{m}}} = \overline{W}_n{}^m, \tag{21}$$

and finally we write $$\tilde{W}_{\cdot n}{}^m = (W_{\cdot n}{}^m)^\dagger = \overline{W}_n{}^m, \tag{22}$$

For comparison, in matrix boldface notation:

$$(W)' = \overline{W}^T = aWa^{-1} = W^{-1}, \tag{23}$$

where "T" defines the usual transpose operation. We note especially that the example in (23) illustrates a degree of non-generality in the way the adjoint is usually calculated in matrix notation. Specifically, defining the adjoint using components in a geometric manifold (using steps (a) and (b) above) can give different results than simply complex conjugating and then performing the transpose operation using the "T" as in (23). In special coordinates, $a_{\bar{n}k} = \delta_{\bar{n}k}$, these two are identical, but in general, that is not always the case for arbitrary $a_{\bar{n}k}$.

Since the $W_{\cdot n}{}^m$ are unitary, the inverse, $$\overset{-1}{W}{}_{\cdot n}^{m},$$

is defined using the adjoint and is expressed (from (22)):

$$\tilde{W}_{\cdot n}^m = \overset{-1}{W}{}_{\cdot n}^m = (W_{\cdot n}^m)^\dagger = \overline{W}_n{}^m, \tag{24}$$

such that $$W_{\cdot k}{}^n W = \delta_{\cdot k}{}^l. \tag{25}$$

We further comment that Schouten did not initially use an over-bar on the kernel symbol as in we have in (25). Considering the $W_{\cdot n}{}^m$ using two upper indices, $W^{m\bar{n}}$ (see (18) and (19)) the corresponding adjoint is similarly calculated:

$$(W^{m\bar{n}})^\dagger = a_{\bar{m}k} a_{\bar{l}n} W^{k\bar{l}} = \overline{W_{\bar{m}\bar{n}}} = \overline{W}_{m\bar{n}} = W_1. \tag{26}$$

The inverse DFT transformation to (9) is thus defined:

$$\tilde{W}_{\cdot m}{}^n F^m = W W_{\cdot k}{}^m f_{\cdot k}^* \delta_k{}^n f^* = f^n, \tag{27}$$

as expected, or when using the form of (19) the inverse DFT is expressed $$\tilde{W}_{m\bar{n}} F^m = W \cdot (W^{m\bar{k}} f_k) = \delta_n{}^{\bar{k}} f_{\bar{k}} = f_{\bar{n}}. \tag{28}$$

A few additional comments from this Section: in tensor transformation theory, there is geometric meaning attributed to these differing but complementary transformation rules. Specific transformations are defined by an allowable Group of transformations, $G_a$, as discussed further in Schouten. The corresponding allowable transformations of basis for the DFT application (digital signal processing) can include fractional and integer shifts of the data origin in addition to scaling and phase transformations. The details for these various transformations in this notation will be discussed in a later set of notes.

Matrix Multiplication Using Index Notation

When calculating with components, index order is important for proper matrix multiplication and thus we adopt the following convention for a rank-2 quantity:

$$A_{\cdot n}^{m \to row}{}_{\downarrow col}, \tag{29}$$

and the inverse of $A_{\cdot n}{}^m$ is notated as, $$\overset{-1}{A}{}_{\cdot n}^{m},$$

such that $$A_{\cdot n}^m \overset{-1}{A}{}_{\cdot k}^n = \delta_{\cdot k}^m$$

where $\delta_{\cdot k}{}^m$ is the Kronecker delta. To illustrate, the matrix multiplication of two matrices A and B is notated as:

$$C_{\cdot k}{}^m = A_{\cdot n}{}^m B_{\cdot k}{}^n, \tag{30}$$

and to be specific we calculate (30) using Mathematica with 2×2 arrays:

$$\text{Table}[\text{Sum}[(A[[um,n]]B[[n,lk]]),\{n,1,NN\}],\{um,1,2\}, \{lk,1,2\}]] \tag{31}$$

where um denotes "upper-m" and lk denotes "lower-k;" the upper/lower dummy variable, n, is left un-notated in Mathematica with regard to its position. The result is of course (30):

$$C_{\cdot k}^m = A_{\cdot n}^m B_{\cdot k}^n = AB = \begin{pmatrix} a_{\cdot 1}^1 b_{\cdot 1}^1 + a_{\cdot 2}^1 b_{\cdot 1}^2 & a_{\cdot 1}^1 b_{\cdot 2}^1 + a_{\cdot 2}^1 b_{\cdot 2}^2 \\ a_{\cdot 1}^2 b_{\cdot 1}^1 + a_{\cdot 2}^2 b_{\cdot 1}^2 & a_{\cdot 1}^2 b_{\cdot 2}^1 + a_{\cdot 2}^2 b_{\cdot 2}^2 \end{pmatrix}, \tag{32}$$

where AB is the conventional matrix product using matrix boldface notation. For comparison, transposing both the m-n and n-k index positions in (30) reverses the order and gives the BA matrix product:

$$C_{\cdot k}^m = A_{\cdot n}^m B_{\cdot k}^n = BA = \begin{pmatrix} b_{\cdot 1}^1 a_{\cdot 1}^1 + b_{\cdot 2}^1 a_{\cdot 1}^2 & b_{\cdot 1}^1 a_{\cdot 2}^1 + b_{\cdot 2}^1 a_{\cdot 2}^2 \\ b_{\cdot 1}^2 a_{\cdot 1}^1 + b_{\cdot 2}^2 a_{\cdot 1}^2 & b_{\cdot 1}^2 a_{\cdot 2}^1 + b_{\cdot 2}^2 a_{\cdot 2}^2 \end{pmatrix}, \tag{33}$$

and the corresponding Mathematica code for (33) is $$\text{Table}[\text{Sum}[(A[[n,um]]B[[lk,n]]),\{n,1,NN\}],\{um,1,2\}, \{lk,1,2\}] \tag{34}$$

Metric Tensor Deriving from Unitary Invariance

In summary of Schouten's notation, various geometric quantities are defined that are distinguished by their transformation rules using index position. A group of allowable transformations, $G_a$, is introduced and then several invariant quantities may be constructed based on invariance of a given symmetry group. One such quantity is the metric tensor, $a_{\bar{k}l}$, defining "distance" in the manifold and also defining the inner product between any two vectors. Therefore, one goal in these notes is to solve for the DFT metric tensor, $a_{\bar{k}l}$, by postulating nothing more than unitary invariance under the action of the point transformation, $W_{\cdot n}{}^m$, as illustrated below. Specifically, given that the $W_{\cdot n}{}^m$ are defined as a unitary transformation, we introduce a metric tensor defined by invariance under the action of the $W_{\cdot n}{}^m$ transformation such that $$W_{\cdot l}{}^m W_{\cdot \bar{k}}{}^{\bar{n}} a_{\bar{n}m} = a_{\bar{k}l}, \qquad (35)$$

or in matrix form:

$$W a W^{-1} = a. \qquad (36)$$

Quantities that are invariant under the action of the unitary group are hermitian and thus the $a_{\bar{k}l}$ satisfy $$a_{\bar{k}l} = (a\bar{k}l)' = \bar{a}_{\bar{l}k}, \qquad (37)$$

The introduction of a hermitian metric $a_{\bar{k}l}$ into the $E_n$ geometric manifold defines the manifold as a $U_n$ which differs from the earlier notation used by Schouten where this manifold was labeled as the $\tilde{R}_n$.

General form of Parseval's Theorem

We can show that Parseval's theorem is really implied by unitary invariance, and not necessarily "energy conservation" as it is commonly referred to in the engineering literature. To begin, we consider the magnitude squared of $F^m \to |F|^2$, giving $$\langle F | F \rangle = |F|^2 = a_{\bar{m}n} \bar{F}^m F^n. \qquad (38)$$

Substituting the DFT transformation rule from (9) into (38) we have $$|F|^2 = a_{\bar{m}n} W_{\cdot k}{}^m \bar{W}_{\cdot \bar{l}}{}^{\bar{n}} \bar{f}^{\bar{l}} f^k, \qquad (39)$$

but since the $a_{\bar{k}l}$ are invariant under this unitary transformation (see (35)) then the RHS of (39) simplifies and we get $$|F|^2 = a_{\bar{k}l} \bar{f}^{\bar{k}} f^l. \qquad (40)$$

Therefore, by comparison with (38), Parseval's theorem is seen to hold for any solution of the $a_{\bar{k}l}$ as implied by unitary invariance (35), and thus in general:

$$a_{\bar{m}n} \bar{F}^{\bar{m}} F^n = a_{\bar{k}l} \bar{f}^{\bar{k}} f^l. \qquad (41)$$

The common form of Parseval's theorem is expressed in vector notation as $$|F|^2 = |f|^2. \qquad (42)$$

To give some perspective on these results we look forward a bit and comment that the standard DFT approach adopts a special solution (coordinate system) for the $a_{\bar{k}l}$ given by the Kronecker delta (as shown later):

$$a_{\bar{n}k} \doteq \delta_{\bar{n}k} \qquad (43)$$

and so in index notation (42) takes the familiar "Euclidean" form:

$$\delta_{\bar{m}n} \bar{F}^{\bar{m}} F^n = \delta_{\bar{k}l} \bar{f}^{\bar{k}} f^l, \qquad (44)$$

or as it is commonly written:

$$|F_1|^2 + |F_2|^2 + L + |F_N|^2 = |f_1|^2 + |f_2|^2 + L + |f_N|^2. \qquad (45)$$

The point is that for a general $a_{\bar{k}l}$, Parseval's theorem (41) will not necessarily take the Euclidean form as demonstrated later below (see (67)), although unitary invariance implies that (41) still holds.

A couple of additional comments: as discussed later the $\delta_{\bar{k}l}$ is a solution for the $a_{\bar{k}l}$ and corresponds to a positive definite signature solution. The approach taken here is motivated by that fact that in general, the eigen-problem requires the use of a general metric, and by no means does this necessarily correspond to the Kronecker delta in a unitary complex vector space, $U_n$. But even so, we later adopt the Kronecker delta solution to make progress on the main point of calculating the DFT in a diagonal basis, and for easy comparison with previously published results.

Metric Solutions

By postulating unitary invariance of the metric we can solve for the $a_{\bar{k}l}$ using (35) and (37). The $W_{\cdot k}{}^m$ are known through identification with (4):

$$W_k^m \equiv \frac{1}{\sqrt{M}}(e^{-i2\pi(mk)/M}) = \frac{1}{\sqrt{2}}\begin{pmatrix} 1 & 1 \\ 1 & -1 \end{pmatrix}. \qquad (46)$$

As discussed above, the inverse transformation of (46) is defined through the adjoint operation in (20). But at this point in the discussion we have not yet solved for the metric $a_{\bar{k}l}$, which is needed to form the adjoint. Therefore, we first solve for the $$\overset{-1}{W}{}^n_{\cdot k}$$

such that $$W_n^m \overset{-1}{W}{}^n_{\cdot k} = \delta^m_{\cdot k}, \qquad (47)$$

and the $$\overset{-1}{W}{}^n_{\cdot k}$$

are given by:

$$\overset{-1}{W}{}^m_{\cdot k} = \overline{W}{}^{\cdot m}_k = \frac{1}{\sqrt{M}}(e^{i2\pi(mk)/M}) = \frac{1}{\sqrt{2}}\begin{pmatrix} 1 & 1 \\ 1 & -1 \end{pmatrix}. \qquad (48)$$

Continuing to the general 2×2 metric, $a_{\bar{k}l}$ is defined as $$a_{\bar{k}l} = \begin{pmatrix} z_{\bar{1}1} & z_{\bar{1}2} \\ z_{\bar{2}1} & z_{\bar{2}2} \end{pmatrix} = \begin{pmatrix} x_{11} + i y_{11} & x_{12} + i y_{12} \\ x_{21} + i y_{21} & x_{22} + i y_{22} \end{pmatrix}, \qquad (49)$$

where the complex notation is dropped on indices of real components. The condition for unitary invariance (35) then gives the following simultaneous system of 4 equations and 8 unknowns:

$$\frac{1}{2}\begin{pmatrix} z_{\bar{1}1} + z_{\bar{1}2} + z_{\bar{2}1} + z_{\bar{2}2} & z_{\bar{1}1} - z_{\bar{1}2} + z_{\bar{2}1} - z_{\bar{2}2} \\ z_{\bar{1}1} + z_{\bar{1}2} - z_{\bar{2}1} - z_{\bar{2}2} & z_{\bar{1}1} - z_{\bar{1}2} - z_{\bar{2}1} + z_{\bar{2}2} \end{pmatrix} = \begin{pmatrix} z_{\bar{1}1} & z_{\bar{1}2} \\ z_{\bar{2}1} & z_{\bar{2}2} \end{pmatrix}. \qquad (50)$$

The system (50) is under-determined and can therefore have many possible solutions but will be further constrained by the hermitian condition (37). Solving (50) eliminates 4 of the unknowns ($z_{\bar{1}1}$ and $z_{\bar{1}2}$) in terms of the other 4 unknowns ($z_{\bar{2}1}$ and $z_{\bar{2}2}$) showing that $a_{\bar{k}l}$ has the general form:

$$a_{\bar{k}l} = \begin{pmatrix} 2z_{21} + z_{22} & z_{21} \\ z_{21} & z_{22} \end{pmatrix}. \tag{51}$$

Next applying the hermitian (symmetry) condition (35) to (51) gives the condition that the 2×2 $a_{\bar{k}l}$ must be real valued:

$$\begin{pmatrix} 2y_{21} + y_{22} & y_{21} \\ y_{21} & y_{22} \end{pmatrix} = \begin{pmatrix} 0 & 0 \\ 0 & 0 \end{pmatrix} \Rightarrow \text{Im}(a_{\bar{k}l}) = 0, \tag{52}$$

but as expected there are multiple solutions for the $a_{\bar{k}l}$ in terms of the 2 final parameters $x_{21}$ and $x_{22}$. The general solution for the 2×2 case is thus reduced from 8 to 2 unspecified real components and is given by $$a_{\bar{k}l} = \begin{pmatrix} 2x_{21} + x_{22} & x_{21} \\ x_{21} & x_{22} \end{pmatrix}. \tag{53}$$

As a check, substituting (53) back into (35) verifies that this $a_{\bar{k}l}$ is invariant under the action of the $W_{\cdot k}{}^m$ for arbitrary (but real) numerical values of $x_{21}$ and $x_{22}$ in (53).

We have shown that an infinite number of solutions exist for the 2×2 metric, $a_{\bar{k}l}$, as implied by unitary invariance in terms of two real parameters. We note that one of the simplest and most important solutions is a special case of (53) when $x_{21}=0$ and $x_{22}=1$ giving the Kronecker delta as mentioned earlier:

$$\underset{1}{a}_{\bar{k}l}\Big|_{\substack{x_{21}\to 0 \\ x_{22}\to 1}} \stackrel{*}{=} \begin{pmatrix} 1 & 0 \\ 0 & 1 \end{pmatrix} \stackrel{*}{=} \delta_{\bar{k}l}, \tag{54}$$

where the complex conjugation is kept for consistency, and the numeral "1" beneath the kernel symbol in Schouten's notation labels this case as a distinct solution, different from other solutions, say $$\underset{2}{a}_{\bar{k}l}.$$

The labeling of kernel symbols in this way is used extensively in the eigen-problem discussed later.

We comment that since (54) is positive definite, as discussed at greater length below in the Section titled Generalized DFT, there will be no distinction between the other various quantities that may be derived from the $a_{\bar{k}l}$ in the $U_2$, and thus, no numerical distinction exists for components labeled by upper/lower indices, or even the complex conjugation of indices. This is seen in the solution (54) above.

As illustrated above there are an infinite number of solutions for the $a_{\bar{k}l}$. Several specific solutions are shown in (55) based on various choices for the $x_{21}$ and $x_{22}$ components:

$$\underset{1}{a}_{\bar{k}l}\Big|_{\substack{x_{21}\to 0 \\ x_{22}\to 1}} \stackrel{*}{=} \begin{pmatrix} 1 & 0 \\ 0 & 1 \end{pmatrix}; \underset{2}{a}_{\bar{k}l}\Big|_{\substack{x_{21}\to 1 \\ x_{22}\to -1}} \stackrel{*}{=} \begin{pmatrix} 1 & 1 \\ 1 & -1 \end{pmatrix} \tag{55}$$

$$\underset{3}{a}_{\bar{k}l}\Big|_{\substack{x_{21}\to 1 \\ x_{22}\to 0}} \stackrel{*}{=} \begin{pmatrix} 2 & 1 \\ 1 & 0 \end{pmatrix}; \underset{4}{a}_{\bar{k}l}\Big|_{\substack{x_{21}\to -\frac{1}{2} \\ x_{22}\to 1}} \stackrel{*}{=} \begin{pmatrix} 0 & -\frac{1}{2} \\ -\frac{1}{2} & 1 \end{pmatrix},$$

Given some specific solutions for the $a_{\bar{k}l}$ in (55), we examine various other quantities that are derived in Schouten's notation. For instance, consider the second solution in (55) that is a multiple of the $W_{\cdot n}{}^m$:

$$a_{\bar{k}l} \equiv \underset{2}{a}_{\bar{k}l} \stackrel{*}{=} \begin{pmatrix} 1 & 1 \\ 1 & -1 \end{pmatrix} \Rightarrow a^{kl} \stackrel{*}{=} \frac{1}{2}\begin{pmatrix} 1 & 1 \\ 1 & -1 \end{pmatrix}, \tag{56}$$

and then for generality define a Complex data vector:

$$f^n = (z^1, z^2) = (x^1 + iy^1, x^2 + iy^2) \tag{57}$$

The DFT transformation (9) is thus given by $$F^m = W_{\cdot n}^m f^n = \frac{1}{\sqrt{2}}(z^1 + z^2, z^1 - z^2). \tag{58}$$

As a consistency check on both the solution for the $a_{\bar{k}l}$ of (56), and the legitimacy of constructing the inverse transformation by use of the adjoint operation in (20), i.e., $$\overset{-1}{W}{}_{\cdot n}^m = (W_{\cdot n}^m)^\dagger \equiv \tilde{W}_{\cdot n}^m,$$

we can check the inverse transformation calculated by way of the adjoint:

$$(W_{\cdot n}^m)^\dagger = \underbrace{a_{\bar{n}k}}_{a_{\bar{n}k}} \underbrace{a^{lm}}_{W_{\cdot l}^k} W_{\cdot l}^k = \begin{bmatrix} 1 & 1 \\ 1 & -1 \end{bmatrix} \frac{1}{\sqrt{2}}\begin{bmatrix} 1 & 1 \\ 1 & -1 \end{bmatrix} \frac{1}{\sqrt{2}}\begin{bmatrix} 1 & 1 \\ 1 & -1 \end{bmatrix} = \frac{1}{\sqrt{2}}\begin{pmatrix} 1 & 1 \\ 1 & -1 \end{pmatrix} = \overset{-1}{W}{}_{\cdot n}^m, \tag{59}$$

in agreement with (48). The inverse DFT transformation is also checked for consistency giving $$\tilde{W}_{\cdot n}^m F^m = \frac{1}{\sqrt{2}}\begin{pmatrix} 1 & 1 \\ 1 & -1 \end{pmatrix}\begin{pmatrix} z^1 + z^2 \\ z^1 - z^2 \end{pmatrix} = (z^1, z^2) = f^n. \tag{60}$$

Several other quantity are derived from the $f^n$ using the $a_{\bar{k}l}$:

$$f^n = (z^1, z^2); f_{\bar{n}} = a_{\bar{n}k}f^k = (z^1 + z^2, z^1 - z^2)$$

$$f^{\bar{k}} = \bar{f} = (\bar{z}^1, \bar{z}^2); \bar{f}_k = a_{\bar{n}k}\bar{f}^{\bar{n}} = (\bar{z}^1 + \bar{z}^2, \bar{z}^1 - \bar{z}^2), \tag{61}$$

and comparing the RHS's in (61), as expected we have $f_{\bar{n}} = \overline{(f_n)}$, showing consistency using the hybrid-index notation. Correspondingly, various other $F^m$ quantities are given by $$F^m = \frac{1}{\sqrt{2}}(z^1 + z^2, z^1 - z^2); F_m = a_{mk}F^k = \sqrt{2}(z^1, z^2) \quad (62)$$

$$\overline{F}^{\bar{m}} = \frac{1}{\sqrt{2}}(\bar{z}^{\bar{1}} + \bar{z}^{\bar{2}}, \bar{z}^{\bar{1}} - \bar{z}^{\bar{2}}); \overline{F}_{\bar{m}} = a_{\bar{n}\bar{m}}\overline{F}^{\bar{n}} = \sqrt{2}(\bar{z}^{\bar{1}}, \bar{z}^{\bar{2}})$$

and components for the $W^{m\bar{n}}$ and the $W_{\overline{m}n}$ are also calculated:

$$W^{m\bar{n}} = a^{\bar{k}\bar{n}} W^m_{\bar{k}} = \begin{pmatrix} \frac{1}{\sqrt{2}} & 0 \\ 0 & \frac{1}{\sqrt{2}} \end{pmatrix}; \quad (63)$$

$$W_{\overline{m}n} = a_{\overline{k}n} W^{\bar{k}}_{\overline{m}} = \begin{pmatrix} \frac{1}{\sqrt{2}} & 0 \\ 0 & \frac{1}{\sqrt{2}} \end{pmatrix}.$$

Using the $f_{\bar{n}}$ from (61) and then comparing with the $F^m$ in (62) we can check the forward DFT for consistency using the $W^m{}_{\bar{n}}$ of (63):

$$W^{m\bar{n}} f_{\bar{n}} = \begin{pmatrix} \frac{1}{\sqrt{2}} & 0 \\ 0 & \frac{1}{\sqrt{2}} \end{pmatrix} \begin{pmatrix} z^1 + z^2 \\ z^1 - z^2 \end{pmatrix} \quad (64)$$

$$= \frac{1}{\sqrt{2}}(z^1 + z^2, z^1 - z^2)$$

$$= F^m.$$

The adjoint operation on the $W^{m\bar{n}}$ and $W_{\overline{m}n}$ of (63) is similarly verified:

$$(W^{m\bar{n}})^\dagger \equiv W = a_{m\bar{k}} a_{\bar{n}l} W^{m\bar{n}} = \begin{pmatrix} 1 & 1 \\ 1 & -1 \end{pmatrix} \begin{pmatrix} \frac{1}{\sqrt{2}} & 0 \\ 0 & \frac{1}{\sqrt{2}} \end{pmatrix} \frac{1}{2}\begin{pmatrix} 1 & 1 \\ 1 & -1 \end{pmatrix} = \begin{pmatrix} \sqrt{2} & 0 \\ 0 & \sqrt{2} \end{pmatrix}, \quad (65)$$

such that $$\overline{W}^{m\bar{n}} W_{\bar{1}} = \delta^n_{\bar{k}}. \quad (66)$$

Finally, Parseval's theorem is demonstrated:

$$a_{\overline{m}n}\overline{F}^{\overline{m}} F^n = a_{\bar{k}l}\bar{z}^{\bar{k}} z^l = |z^1|^2 - |z^2|^2, \quad (67)$$

which is not in Euclidean form but is nevertheless invariant.

Comments on a General DFT

Further restrictions may be placed on the solution values for the $x_{21}$ and $x_{22}$ in (53), in accordance with the classification of the $a_{\bar{k}l}$ as being positive definite, negative definite, or indefinite, corresponding to the number of values (or signature)>0, <0, or mixed, respectively, along the diagonal of the $a_{\bar{k}l}$). Note that when $a_{\bar{k}l}$ is definite that there is no distinction between the various quantities that may be derived from $a_{\bar{k}l}$ in the $U_2$ and thus, no numerical distinction exists for components labeled by upper/lower indices, or even the complex conjugation of indices; these notations are merely formal in this instance. We comment further that since the $a_{\bar{k}l}$ are required when solving the eigen-problem in general (more details on this below) there can in principle at least, be different solutions for the eigen-problem corresponding to different solutions for the $a_{\bar{k}l}$. Note that all earlier work on the DFT eigen-problem uses the $a_{\bar{k}l} = \delta_{\bar{k}l}$ solution without considering the possibility that the $a_{\bar{k}l}$ might be defined in a more general way based on unitary invariance. Thus, different solutions for the $a_{\bar{k}l}$ may lead to possibly different DFT eigen-quantities, but all the while preserving unitary invariance and the hermitian character of the $a_{\bar{k}l}$. Thus, from the perspective of the transformation theory of complex vector spaces, we can regard some properties of the DFT as deriving from the characteristics of the $a_{\bar{k}l}$, i.e., that (a) $a_{\bar{k}l}$ is invariant under unitary transformations and (b) is hermitian. Condition (b) really derives from (a) but it is convenient when solving for the $a_{\bar{k}l}$ components (as illustrated above) to regard (b) as an independent condition.

Similarly as in the 2×2 example, we can solve for the $a_{\bar{k}l}$ corresponding to higher dimensional data sets. Of special interest are solutions in which the $a_{\bar{k}l}$ are complex valued since these solutions provide further consistency checks on the proper use of Schouten's' notation. We proceed by deriving the 4×4 $W_{\cdot\bar{k}}{}^m$ and its inverse, $$\overline{W}^{-1}{}^m_{\bar{k}},$$

from (46):

$$W^m_{\bar{k}} = \frac{1}{2}\begin{pmatrix} 1 & 1 & 1 & 1 \\ 1 & -i & -1 & i \\ 1 & -1 & 1 & -1 \\ 1 & i & -1 & -i \end{pmatrix}; \quad (68)$$

-continued $$\overline{W}^{-1}{}^m_{\bar{k}} = W = \overline{W}^m_{\bar{k}} = \frac{1}{2}\begin{pmatrix} 1 & 1 & 1 & 1 \\ 1 & i & -1 & -i \\ 1 & -1 & 1 & -1 \\ 1 & -i & -1 & i \end{pmatrix},$$

and a general 4×4 metric is defined by $$a_{\bar{k}l}\begin{pmatrix} z_{\bar{1}1} & z_{\bar{1}2} & z_{\bar{1}3} & z_{\bar{1}4} \\ z_{\bar{2}1} & z_{\bar{2}2} & z_{\bar{2}3} & z_{\bar{2}4} \\ z_{\bar{3}1} & z_{\bar{3}2} & z_{\bar{3}3} & z_{\bar{3}4} \\ z_{\bar{4}1} & z_{\bar{4}2} & z_{\bar{4}3} & z_{\bar{4}4} \end{pmatrix}. \quad (69)$$

The condition for unitary invariance (35) then gives a simultaneous system of 16 equations and 32 unknowns which can be further reduced to 6 free parameters by imposing the hermitian condition (37) on the $a_{\bar{k}l}$. After considerable algebra the general solution to (35) for the $a_{\bar{k}l}$, constrained by the hermitian condition (37) is given by $$a_{\bar{k}l} = \begin{pmatrix} x_{33} + 2(x_{41} + x_{43}) & x_{41} - iy_{43} & (x_{33} + x_{41} - x_{42} + x_{43} - x_{44} + 2iy_{43}) & x_{41} - iy_{43} \\ x_{41} + iy_{43} & x_{44} & x_{43} + iy_{43} & x_{42} \\ (x_{33} + x_{41} - x_{42} + x_{43} - x_{44} + 2iy_{43}) & x_{43} - iy_{43} & x_{33} & x_{43} - iy_{43} \\ x_{43} + iy_{43} & x_{42} & x_{43} + iy_{43} & x_{44} \end{pmatrix} \quad (70)$$

As before, there are an infinite number of both real and complex valued 4×4 solutions for the $a_{\bar{k}l}$ in terms of the 6 free parameters in (70). Several example solutions corresponding to basic numerical values for the x and y components are listed in (71):

$$\left. {}_1^{}a_{\bar{k}l} \right|_{\substack{x_{33}\to 1, x_{44}\to 1 \\ x_{41}\to 0, x_{42}\to 0 \\ x_{43}\to 0, y_{43}\to 0}} \stackrel{*}{=} \begin{pmatrix} 1 & 0 & 0 & 0 \\ 0 & 1 & 0 & 0 \\ 0 & 0 & 1 & 0 \\ 0 & 0 & 0 & 1 \end{pmatrix}; \quad (71)$$

$$\left. {}_2^{}a_{\bar{k}l} \right|_{\substack{x_{33}\to 1, x_{44}\to 1 \\ x_{41}\to 0, x_{42}\to 0 \\ x_{43}\to 0, y_{43}\to 1}} \stackrel{*}{=} \begin{pmatrix} 1 & -i & 2i & -i \\ i & 1 & i & 0 \\ -2i & -i & 1 & -i \\ i & 0 & i & 1 \end{pmatrix}$$

$$\left. {}_3^{}a_{\bar{k}l} \right|_{\substack{x_{33}\to 1, x_{44}\to 1 \\ x_{41}\to -1, x_{42}\to 0 \\ x_{43}\to 1, y_{43}\to 0}} \stackrel{*}{=} \begin{pmatrix} 1 & -1 & 0 & -1 \\ -1 & 1 & 1 & 0 \\ 0 & 1 & 1 & 1 \\ -1 & 0 & 1 & 1 \end{pmatrix};$$

$$\left. {}_4^{}a_{\bar{k}l} \right|_{\substack{x_{33}\to 1, x_{44}\to 1 \\ x_{41}\to -1, x_{42}\to 0 \\ x_{43}\to 0, y_{43}\to 0}} \stackrel{*}{=} \begin{pmatrix} -1 & -1 & -1 & -1 \\ -1 & 1 & 0 & 0 \\ -1 & 0 & 1 & 0 \\ -1 & 0 & 0 & 1 \end{pmatrix}.$$

Once again we pick a solution and then illustrate a few of the basic quantities that are derived for the DFT in Schouten's notation. For generality, consider the complex-valued solution of (71) for the $a_{\bar{k}l}$:

$$a_{\bar{k}l} \equiv {}_2a_{\bar{k}l} \stackrel{*}{=} \begin{pmatrix} 1 & -i & 2i & -i \\ i & 1 & i & 0 \\ -2i & -i & 1 & -i \\ i & 0 & i & 1 \end{pmatrix}, \quad (72)$$

and then the inverse is given by $$\overset{-1}{a}{}_{\bar{k}l} = a^{k\bar{l}} \stackrel{*}{=} \frac{1}{7}\begin{pmatrix} 1 & -2-i & -2+2i & -2-i \\ -2+2i & 5 & 2+i & -2 \\ -2-2i & 2-i & 1 & 2-i \\ -2+i & -2 & 2+i & 5 \end{pmatrix}. \quad (73)$$

To illustrate some specific quantities we define a general complex "data" vector:

$$f^n = (z^1, z^2, z^3, z^4), \quad (74)$$

and then the DFT transformation (9) is given by $$F^m = W^m_{\ n} f^n = \frac{1}{2}\begin{pmatrix} z^1 + z^2 + z^3 + z^4 \\ z^1 - iz^2 - z^3 + iz^4 \\ z^1 - z^2 + z^3 - z^4 \\ z^1 + iz^2 - z^3 - iz^4 \end{pmatrix}. \quad (75)$$

Applying the inverse DFT transformation shows that as expected:

$$\tilde{W}^n_{\ m} F^m = \frac{1}{4}\begin{pmatrix} 1 & 1 & 1 & 1 \\ 1 & i & -1 & -i \\ 1 & -1 & 1 & -1 \\ 1 & -i & -1 & i \end{pmatrix}\begin{pmatrix} z^1 + z^2 + z^3 + z^4 \\ z^1 - iz^2 - z^3 + iz^4 \\ z^1 - z^2 + z^3 - z^4 \\ z^1 + iz^2 - z^3 - iz^4 \end{pmatrix} \quad (76)$$

$$= (z^1, z^2, z^3, z^4)$$

$$= f^n.$$

Other quantities are derived from the $f^n$ using the $a_{\bar{k}l}$ of (72), e.g., consider $$f_{\bar{k}} = a_{\bar{k}n} f^n = \frac{1}{2}\begin{pmatrix} z_1 - iz_2 + 2iz_3 - iz_4 \\ iz_1 + z_2 + iz_3 \\ -2iz_1 - iz_2 + z_3 - iz_4 \\ iz_1 + iz_3 + z_4 \end{pmatrix}, \quad (77)$$

and we further check that $f_{\bar{n}} = \overline{(f_n)}$, by calculating:

$$a_{\bar{k}n} \overline{(f^k)} = a_{\bar{k}n} \bar{f}^{\bar{k}} \quad (78)$$

$$= \bar{f}_n$$

$$= \frac{1}{2}\begin{pmatrix} \bar{z}_1 + i\bar{z}_2 - 2i\bar{z}_3 + i\bar{z}_4 \\ -i\bar{z}_1 + \bar{z}_2 - i\bar{z}_3 \\ -2i\bar{z}_1 + i\bar{z}_2 + \bar{z}_3 + i\bar{z}_4 \\ -i\bar{z}_1 - i\bar{z}_3 + \bar{z}_4 \end{pmatrix}.$$

Comparing $f_{\bar{n}}$ in (77) to the complex conjugation of $\bar{f}_n$ in (78) we see that as expected:

$$f_{\bar{n}} = \overline{(f_n)}, \quad (79)$$

demonstrating consistency using the hybrid-index notation. Correspondingly, we can lower indices on the $F^m$ to get $$F_{\bar{k}} = a_{\bar{k}m} F^m \quad (80)$$

-continued $$= \frac{1}{2}\begin{pmatrix} z^1 + (1-2i)z^2 + (1+4i)z^3 + (1-2i)z^4 \\ (1+2i)z^1 - iz^2 - (1-2i)iz^3 + iz^4 \\ (1-4i)z^1 - (1+2i)z^2 + z^3 - (1+2i)z^4 \\ (1+2i)z^1 + iz^2 + (2i-1)z^3 - iz^4 \end{pmatrix}.$$

Parseval's theorem is invariant as expected:

$$a_{\overline{m}n} \overline{F}^m F^n = a_{\overline{k}l} \overline{f}^k f^l = |z^1|^2 + |z^2|^2 + |z^3|^2 + |z^4|^2, \quad (81)$$

but the Euclidean form in (81) deriving from this particular $$a_{\overline{m}n}$$

is not necessarily expected. As pointed out earlier, Parseval's theorem can take different forms for the different $a_{\overline{k}l}$ solutions. E.g., considering solution 4 of the $a_{\overline{k}l}$ in (71) we have $$a_{\overline{m}n} \overline{F}^m F^n = a_{\overline{k}l} \overline{f}^k f^l \quad (82)$$

$$= -|z^1|^2 + |z^2|^2 + |z^3|^2 + |z^4|^2 - 2z^1(z^2 + z^3 + z^4),$$

which is invariant but not real valued.

Eigenvalue-Eigenvector Problem

Given the formalism above, we can examine the eigenvalue-eigenvector (eigen-problem) from a more general viewpoint than what is normally discussed. The additional generality stems from the possibility that the metric is not necessarily the Kronecker delta, constrained only by its invariance under unitary transformations and hermitian symmetry. We have shown from a general viewpoint that the $a_{\overline{k}l} = \delta_{\overline{k}l}$ solution is an important "base" solution without additional worries that perhaps something was overlooked. We have also shown that other solutions for the $a_{\overline{k}l}$ exist based simply on unitary invariance, and thus, more general calculations of the DFT and its various quantities are easily extended to arbitrary basis sets. Some advantages in calculation may be possible in these other general basis sets and we will reserve this topic for a future set of notes. For now, we examine a specific basis set that follows by solution to the eigen-problem as discussed below.

Before examining the specifics of the eigen-problem for the DFT, some generalities are discussed. The eigenvalue-eigenvector problem seeks solutions to the following set of equations:

$$T_{\overline{m}n} v^n_a = \sigma_a v_{\overline{m},a}, \quad (83)$$

for the vectors $$v^n_a$$

of a general rank-2 quantity, $T_{\overline{m}n}$. The scalar values, $$\sigma_a,$$

are the eigenvalues and the $$v^n_a$$

are the eigenvectors. The "a" index below the kernel object, in this case $$, v_a$$

and $$\sigma_a$$

does not refer to a component, but rather, the a-th eigenvector, $$v_a$$

corresponding to the a-th eigenvalue, $$\sigma_a$$

as separate and distinct solutions. We therefore choose indices from the set, {a, b, c, d}, to label the kernel objects corresponding to distinct eigen-solutions, and then reserve the index range, {k, l, m, n}, to label components of a given basis.

Continuing to the DFT application we substitute $W_{\overline{m}n}$ of (26) into (83):

$$W_{\overline{m}n} v^n_a = \sigma_a v_{\overline{m},a}, \quad (84)$$

and make special note that we have switched to a common kernel symbol for the Fourier transform pair, $(F^m, f^n) \rightarrow (v_{\overline{m}}, v^n)$, with the substitutions:

$$v^n \equiv f^n \text{ and } F_{\overline{m}} \equiv v_{\overline{m}}. \quad (85)$$

Looking ahead, we mention now that the solution to (84) results in a transformation of the $W_{\overline{m}n}$ into a diagonal basis by use of the similarity transform. In the context of the present application, and noting expression (9) for the Fourier transform, (84) then has an interesting geometrical interpretation as solving for the Fourier transform pair, $(v_{\overline{m}}, v^n)$, that are "parallel" to one another, or equivalently, left invariant under the action of the DFT (aside from the scaling factor σ). To give greater emphasis to this last comment, consider the overall structure of the DFT transformation in a diagonal basis for the 4×4 case (for now using the notation of (9) to emphasize this last point):

$$W_{\overline{m}n}{}_{a}^{n} = \sigma v_{\overline{m}} \Rightarrow \begin{pmatrix} \sigma_1 & 0 & 0 & 0 \\ 0 & \sigma_2 & 0 & 0 \\ 0 & 0 & \sigma_3 & 0 \\ 0 & 0 & 0 & \sigma_4 \end{pmatrix} \begin{pmatrix} f^{1'} \\ f^{2'} \\ f^{3'} \\ f^{4'} \end{pmatrix} \quad (86)$$

$$= \begin{pmatrix} \sigma_1 f^{1'} \\ \sigma_2 f^{2'} \\ \sigma_3 f^{2'} \\ \sigma_4 f^{2'} \end{pmatrix}$$

$$= \sigma_a \begin{pmatrix} F_{1'} \\ F_{2'} \\ F_{3'} \\ F_{4'} \end{pmatrix},$$

where the primes on indices denote the data and its transform in the diagonal basis as discussed further below. Thus as mentioned above, the Fourier transform pair are co-linear when calculated in the diagonal basis:

$$\begin{pmatrix} F_{1'} \\ F_{2'} \\ F_{3'} \\ F_{4'} \end{pmatrix} = \begin{pmatrix} (\sigma_1/\sigma_a) f^{1'} \\ (\sigma_2/\sigma_a) f^{2'} \\ (\sigma_3/\sigma_a) f^{3'} \\ (\sigma_4/\sigma_a) f^{4'} \end{pmatrix}, \quad (87)$$

differing only by a scalar factor. This example illustrates the geometrical significance of the DFT transform in a diagonal basis and motivates using the same kernel symbol for the Fourier transform pair in (85), since the quantities are co-linear. This difference in notation is to be contrasted with the approach taken so far where the kernel symbols have been kept distinct, and the $W_{\cdot n}{}^m$ transformation was regarded as a point transformation.

Continuing with the eigen-problem calculation we use the metric tensor to show that (84) is equivalently expressed in the form:

$$\left(W_{mn} - \sigma_a a_{mn}\right) v_a^n = 0, \quad (88)$$

or also as $$\left(W_{\cdot n}^m - \sigma_a \delta_{\cdot n}^m\right) v_a^n = 0. \quad (89)$$

And thus the eigen-problem, when cast in the form of (89), does not depend on a specific choice for the metric. Thus we solve the DFT eigen-problem in the form of (89). The eigenvalues for the $W_{\cdot n}{}^m$ are then solutions to $$\det\left(W_{\cdot n}^m - \sigma_a \delta_{\cdot n}^m\right) = 0. \quad (90)$$

Eigen-Problem for the DFT Matrix

The eigenvector-eigenvalue problem for the DFT matrix in the form of (89) has been examined extensively and so we review some of these basic results before examining the diagonal DFT calculation in detail. Since $$W^4 = I, \quad (91)$$

the eigenvalues for the DFT matrix for N>3 are non-unique and are multiples of the so-called "roots of unity:"

$$\sigma_a = e^{i\pi a/2}; a = 1, \ldots, 4; \Rightarrow \sigma_a \in \{\pm 1, \pm i\}. \quad (92)$$

Specifically, (92) then becomes $$\sigma_1 = 1, \sigma_2 = -1, \sigma_3 = i, \sigma_4 = -i. \quad (93)$$

The eigenvalues of the DFT transform are not all distinct for N≥4, so there are many possible sets of eigenvectors satisfying (89). As a consequence of having these non-unique eigenvalues, the corresponding eigenvectors for these degenerate eigenvalues are not necessarily orthogonal. The importance of having an orthogonal set of eigenvectors for the present application is not known, but should this turn out to be an issue, the Gramm-Schmidt procedure can always be applied or an orthogonal set can be obtained. Further consequences and examples of this analysis for higher dimensional DFTs will be discussed in a future set of notes. For now we examine a low-dimensional example to map out some of the basic features.

Eigenvalues

Considering M=N=4, the DFT transform and its inverse is given in (68) which is reproduced below:

$$W_{\cdot k}^m = \frac{1}{2}\begin{pmatrix} 1 & 1 & 1 & 1 \\ 1 & -i & -1 & i \\ 1 & -1 & 1 & -1 \\ 1 & i & -1 & -i \end{pmatrix};$$

$$\overline{W}_{\cdot k}^m = W\%_{\cdot k}^m = \overline{W}_k^m = \frac{1}{2}\begin{pmatrix} 1 & 1 & 1 & 1 \\ 1 & i & -1 & -i \\ 1 & -1 & 1 & -1 \\ 1 & -i & -1 & i \end{pmatrix}.$$

Considering solutions of (90) we have $$\det\left(W_{\cdot n}^m - \sigma_a \delta_{\cdot n}^m\right) = 0,$$

and for the 4×4 example has the solution:

$$(\sigma_a - 1)^2(\sigma_a + 1)(\sigma_a + i) = 0 \Rightarrow \{\sigma_1 = 1, \sigma_2 = -1, \sigma_3 = 1, \sigma_4 = -i\}, \quad (94)$$

with one degenerate eigenvalue, $$\sigma_1 = \sigma_3 = 1.$$

Multiplicity of Eigenvalues for the DFT Matrix

As discussed above, the significance of (91) for the DFT eigenvalue problem is that degenerate eigenvalues appear for N≥4. The "multiplicities" of these eigenvalues are defined as the number of times each eigenvalue appears. For the 4×4 example in (94) we therefore have $$m_1=2, m_2=1, m_3=1, m_4=0, \quad (95)$$

where the $m_k$ ordering corresponds to the ordering of (93). These results can be generalized to higher dimensions by the following Table of multiplicities for each eigenvalue:

TABLE 1

| M = N | $m_1$ for $\sigma_1 = 1$: | $m_2$ for $\sigma_2 = -1$: | $m_3$ for $\sigma_3 = i$: | $m_4$ for $\sigma_4 = -i$: |
|---|---|---|---|---|
| 4m | m + 1 | m | m | m − 1 |
| 4m + 1 | m + 1 | m | m | m |
| 4m + 2 | m + 1 | m + 1 | m | m |
| 4m + 3 | m + 1 | m + 1 | m + 1 | m |

By inspection of Table 1, the 4×4 case corresponds to the m=1 value in the top row giving the multiplicities of eigenvalues listed in (95). Similarly, it can be shown that for the 5×5 case, the eigenvalues are solutions of $$(\sigma_a - 1)^2(\sigma_a + 1)(\sigma_a^2 + 1) = \quad (96)$$

$$0 \Rightarrow \left\{\sigma_1 = 1, \sigma_2 = -1, \sigma_3 = i, \sigma_4 = -i, \sigma_5 = 1\right\},$$

corresponding to the $2^{nd}$ row of the Table with m=1. From (96) (or equivalently Table 1) the multiplicities for the 5×5 case are thus $$m_1=2, m_2=1, m_3=1, m_4=1. \quad (97)$$

To illustrate a higher dimensional example, consider say M=N=131=4·32+3, corresponding to the third row of the Table giving the following multiplicities:

$$m_1=33, m_2=22, m_3=22, m_4=32. \quad (98)$$

Eigenvectors

Given the eigenvalues in (94) the eigenvectors corresponding to each eigenvalue are constructed using (89). It is instructive to consider this process for the eigenvectors corresponding to the degenerate first and third eigenvalues, $$\sigma_1 = \sigma_3 = 1.$$

The first eigenvector is obtained as a solution to the set of linear equations:

$$\left(W_{,n}^m - \sigma_a \delta_{,n}^m\right) v_a^n \Big|_{a \to 1} = \quad (99)$$

$$0 \Rightarrow \begin{pmatrix} 1-\sigma_1 & 1 & 1 & 1 \\ 1 & -i-\sigma_1 & -1 & i \\ 1 & -1 & 1-\sigma_1 & -1 \\ 1 & i & -1 & -i-\sigma_1 \end{pmatrix} \begin{pmatrix} v_1^1 \\ v_1^2 \\ v_1^3 \\ v_1^4 \end{pmatrix} = \begin{pmatrix} 0 \\ 0 \\ 0 \\ 0 \end{pmatrix},$$

which simplifies to $$\begin{pmatrix} -v_1^1 + v_1^2 + v_1^3 + v_1^4 \\ v_1^1 - (2+i)v_1^2 - v_1^3 i v_1^4 \\ v_1^1 - v_1^2 - v_1^3 - v_1^4 \\ v_1^1 + i v_1^2 - v_1^3 - (2+i)v_1^4 \end{pmatrix} = \begin{pmatrix} 0 \\ 0 \\ 0 \\ 0 \end{pmatrix}. \quad (100)$$

The solution to (100) for $$v_1^n$$

is therefore given in terms of two arbitrary components, say $$v_1^3 \text{ and } v_1^4:$$

$$\left(v_1^1, v_1^2, v_1^3, v_1^4\right) = \left(v_1^3 + 2v_1^4, v_1^4, v_1^3, v_1^4\right). \quad (101)$$

We point out that two components are required because of the two-fold degeneracy of the $$\sigma_1 = \sigma_3 = 1$$

eigenvalue. In general, the eigenvectors corresponding to unique eigenvalues are specified in terms of a single component. Continuing we arbitrarily choose $$v_1^4 = 1$$

and $$v_1^3 = 0,$$

to obtain a realization for the first eigenvector:

$$\left(v_1^1, v_1^2, v_1^3, v_1^4\right) = \left(v_1^3 + 2v_1^4, v_1^4, v_1^3, v_1^4\right)\Big|_{\substack{v_1^4 \to 1 \\ v_1^3 \to 0}} \Rightarrow v_1^n \quad (102)$$

$$= (2, 1, 0, 1).$$

Note also that since, $$\sigma_1 = \sigma_3 = 1,$$

are degenerate, the solution to (99) is trivially the same as (100). Therefore, a solution for follows immediately by choosing complementary but arbitrary numerical values for the $$v_1^3$$

and $$v_1^4$$

in (102), e.g., $$v_3^4 = 0$$

$$v_3^3 = 1: \qquad (103)$$

$$\left(v_3^1, v_3^2, v_3^3, v_3^4\right) = \left(v_3^3 + 2v_3^4, v_3^4, v_3^3, v_3^4\right) \to v_3^n = (1, 0, 1, 0)$$

Similarly, we can solve for the remaining eigenvectors corresponding to their eigenvalues, $$\sigma_2 = -1$$

and $$\sigma_4 = -i.$$

In summary, a set of eigenvectors (but not the only set) for the 4×4 DFT transformation is summarized below:

$$v_1^n = \begin{pmatrix} 2 \\ 1 \\ 0 \\ 1 \end{pmatrix}, v_2^n = \begin{pmatrix} -1 \\ 1 \\ 1 \\ 1 \end{pmatrix}, v_3^n = \begin{pmatrix} 1 \\ 0 \\ 1 \\ 0 \end{pmatrix}, v_4^n = \begin{pmatrix} 0 \\ -1 \\ 0 \\ 1 \end{pmatrix}. \qquad (104)$$

Since two of the eigenvalues are degenerate, (102) and (104) collectively do not form an orthogonal system as can be verified by forming the inner product between any two vectors using the "base" solution, $$a_{\bar{k}l} \stackrel{*}{=} \delta_{\bar{k}l}$$

of (71):

$$\left\langle v_m \middle| v_n \right\rangle = a_{\bar{k}l} \bar{v}_m^{\bar{k}} v_n^l = \delta_{\bar{k}l} \bar{v}_m^{\bar{k}} v_n^l = \begin{pmatrix} 3 & 0 & 1 & 0 \\ 0 & 2 & 0 & 0 \\ 1 & 0 & 1 & 0 \\ 0 & 0 & 0 & 1 \end{pmatrix}, \qquad (105)$$

where the off-diagonal entries correspond to the $$\sigma_1 = \sigma_3 = 1$$

value. For reference, we can still construct an orthonormal set from (104):

$$u_1^n = \frac{1}{\sqrt{6}}\begin{pmatrix} 2 \\ 1 \\ 0 \\ 1 \end{pmatrix}, u_2^n = -\frac{1}{2}\begin{pmatrix} -1 \\ 1 \\ 1 \\ 1 \end{pmatrix}, u_3^n = \frac{1}{2\sqrt{3}}\begin{pmatrix} 1 \\ -1 \\ 3 \\ -1 \end{pmatrix}, u_4^n = \frac{1}{\sqrt{2}}\begin{pmatrix} 0 \\ -1 \\ 0 \\ 1 \end{pmatrix}. \qquad (106)$$

and verify as expected that $$\delta_{\bar{k}l} \bar{u}_m^{\bar{k}} u_n^l = \delta_{mn}. \qquad (107)$$

Similarity Transform

Given the eigenvectors of (104) we form the "similarity" transform using the eigenvectors as columns. We denote this as a transformation of basis and we find by construction that the similarity transform, $S_m^{m'}$, and its inverse, $$\overset{-1}{S}{}_m^{m'},$$

are given by $$S_m^{m'} = \begin{pmatrix} 2 & -1 & 1 & 0 \\ 1 & 1 & 0 & -1 \\ 0 & 1 & 1 & 0 \\ 1 & 1 & 0 & 1 \end{pmatrix}; \overset{-1}{S}{}_m^{m'} = \frac{1}{4}\begin{pmatrix} 1 & 1 & -1 & 1 \\ -1 & 1 & 1 & 1 \\ 1 & -1 & 3 & -1 \\ 0 & -2 & 0 & 2 \end{pmatrix}. \qquad (108)$$

When using the kernel-index method for transformations of basis, say $x^{m'} = A_m^{m'} x^m$, that the $A_m^{m'}$ quantities do not use dots above or below an index to mark index placement. This differs from the notation for point transformations, which does use the dots e.g., $F^m = W_{.n}^{m} f^n$. The reason for this is to discourage the "raising" or "lowering" of indices on the $A_m^{m'}$ to avoid an inconsistency when using the metric tensor. This inconsistency can occur because the metric $a_{\bar{k}l}$ also transforms under the $A_m^{m'}$, and thus has different components in the new coordinate system. For point transformations however, no coordinate transformation occurs and thus indices can be raised or lowered using a single (unambiguous) metric.

We then verify that applying the similarity transformation to the $W_{.n}^{m}$ gives as expected:

$$SWS^{-1} \equiv S_m^{m'} W_{\cdot n}^m \overset{-1}{S}{}_{n'}^{n} = W_{\cdot n'}^{m'} = \begin{pmatrix} \sigma_1 & 0 & 0 & 0 \\ 0 & \sigma_2 & 0 & 0 \\ 0 & 0 & \sigma_3 & 0 \\ 0 & 0 & 0 & \sigma_4 \end{pmatrix} = \begin{pmatrix} 1 & 0 & 0 & 0 \\ 0 & -1 & 0 & 0 \\ 0 & 0 & 1 & 0 \\ 0 & 0 & 0 & -i \end{pmatrix}. \quad (109)$$

As a check on index ordering we run the following line of Mathematica code with Si defined as the inverse of the Sin (108):

Table[Sum[$S[[m,ump]]W[[m,n]]Si[[lnp,n]]$,{n,l,M},
{m,l,M}],{ump,l,M},{lnp,l,M}]    (110)

where ump denotes "upper-m-prime" and lnp is "lower-m-prime."

It is of further interest to point out that if the similarity transform is constructed using the orthonormal eigenvectors of (106) as columns (and correspondingly it inverse), then the application of the "orthonormal" similarity transform to the $W_{\cdot n}{}^m$ also gives (109). Therefore, the similarity transform that leaves the $W_{\cdot n}{}^m$ in diagonal form is certainly not unique, so many possible choices can be made for the $S_n{}^{m'}$. So as indicated by calculations thus far, it does not seem to matter whether or not the eigenvectors forming the $S_n{}^{m'}$ are orthogonal, and this can greatly simplify the initial calculations needed for calculating in the diagonal basis.

DFT Calculation in Diagonal Form

The diagonal form of the DFT in (109) shows that the DFT calculation can be performed both efficiently and elegantly as simply a multiplication of the entries on the main diagonal (the eigenvalues), to the corresponding data components that have been pre-multiplied using the similarity matrix. This means that after pre-multiplying the data, the DFT transform is reduced to a vector product consisting of N operations rather than a matrix multiply with $N^2$ operations (or N log N when using the FFT). In reality though, this reduction in computation cost is only partly true in terms of the performance gains, i.e., the diagonal DFT representation does obviously lead to a speedy calculation for one part of the DFT operation, but in general, this gain is offset by the added computational cost of having to pre-transform the data and then back-transform to bring the Fourier transform into the original basis as illustrated below. But the key is that these latter operations may not need to be performed at every step in an iterative transform application, such as with phase retrieval. Additional details on this calculation approach are outlined below.

To begin, we write down the DFT calculation in the diagonal basis after switching the notation back to distinct kernel symbols for the data and its transform:

$$f^{n'} = W_{\cdot n'}{}^{m'} f^{n'}, \quad (111)$$

where the m' represents the transformation of basis under the action of the similarity transform as illustrated above in (109). Since the only non-zero values for the $W_{\cdot n'}{}^{m'}$ are along the diagonal, we form a vector, $$\sigma_{m'},$$

form the eigenvalues (i.e., the diagonal entries of the $W_{\cdot n'}{}^{m'}$) as in (94). Continuing with the calculation of (111, the starting data, $f_k$, are pre-multiplied using the inverse similarity transform, $$\overset{-1}{S}{}_{n}^{n'},$$

to give $$f^{n'} = \overset{-1}{S}{}_{n}^{n'} f^n. \quad (112)$$

The diagonal DFT is then the product of the N components of the $$\sigma_{m'}$$

and the f'' defined by (112):

$$\boxed{F^{m'} = \sigma_{m'} \cdot f_{m'}}, \quad (113)$$

where no sum is implied over the (m',m') pair. To complete the calculation, the "diagonal" DFT components in (113) need to be transformed back to the original DFT basis, $F^m$. To obtain this result we express the LHS of (111) in terms of components in the original basis:

$$F^{m'} = \overset{-1}{S}{}_{m}^{m'} F^m, \quad (114)$$

and therefore the original Fourier transform components are readily obtained by back-transforming the $F^{m'}$ of (114) using the similarity transform:

$$F^n = S_{n'}^n F^{n'} = S_{n'}^n \overset{-1}{S}{}_{m}^{n'} F^m = \delta_m^n F^m. \quad (115)$$

The inverse DFT is also calculated in a diagonal basis since the inverse of a diagonal matrix is found by populating its diagonal entries with the inverse of the individual components. Therefore, given the $W_{\cdot n'}{}^{m'}$, the inverse is simply (no sum is implied on the RHS over the (m', m') pair):

$$\overset{-1}{W}{}_{\cdot n'}^{m'} = \left(1 \Big/ \sigma_{m'}\right) \delta_{n'}^{m'}, \quad (116)$$

and then inverse DFT transformation in the diagonal basis gives as expected:

$$\left(1 \Big/ \sigma_{m'}\right) \cdot F^{m'} = \left(1 \Big/ \sigma_{m'}\right) \cdot \sigma_{m'} \cdot f^{m'} = f^{m'}, \quad (117)$$

Figure 2:
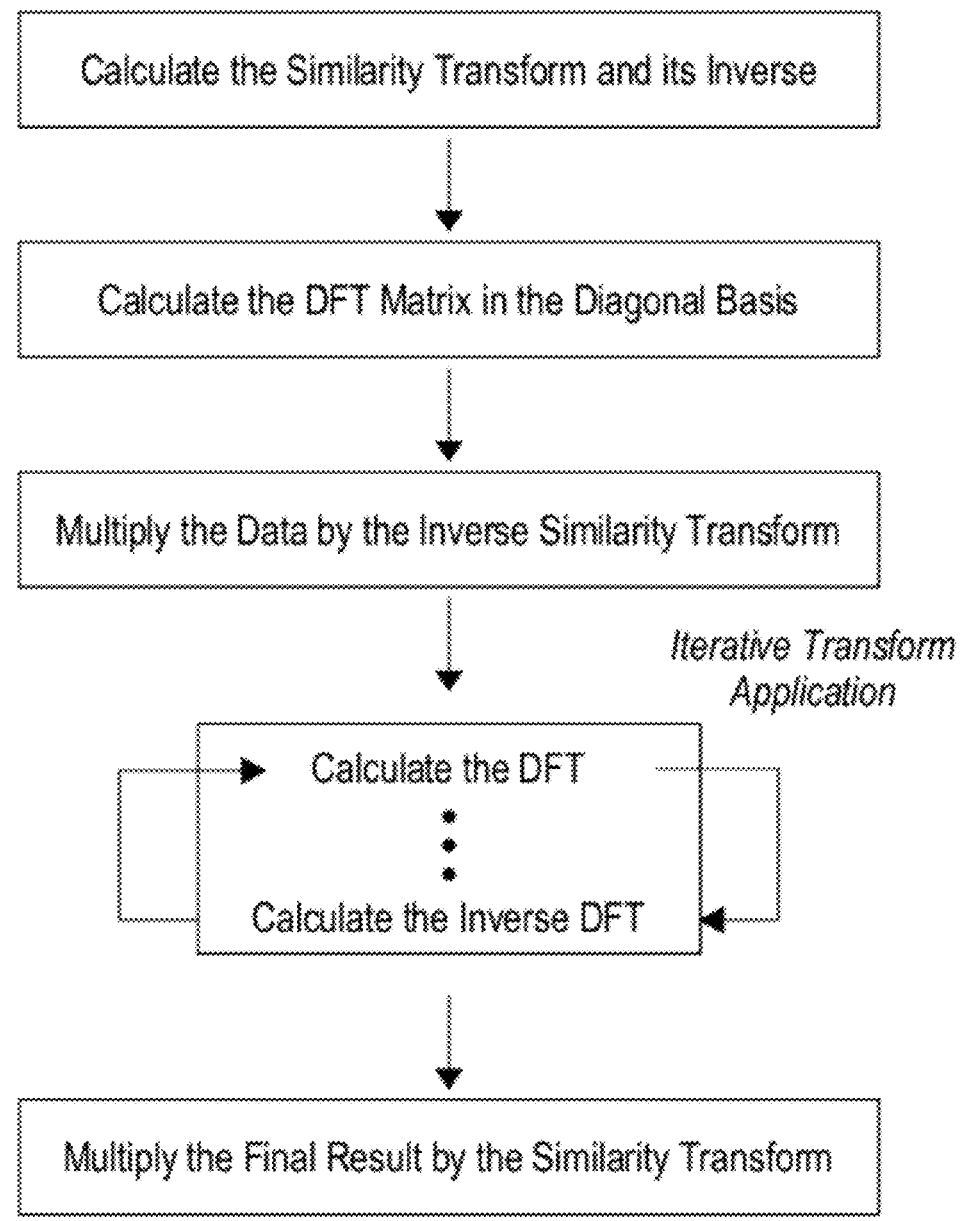
FIG. 2 is a flowchart representing the methodology of a discrete Fourier transform processor in a complex vector space, according to an example embodiment.

The overall point is that for applications where it is feasible to perform the DFT in a diagonal basis, the similarity transform and its inverse can be pre-calculated. The multiplication of the similarity transform with the data can also be pre-calculated. Then at an appropriate point, the DFT results can be transformed back to the original basis using the inverse similarity transform, preferably at the end of an iterative loop. The approach is summarized in FIG. 2.

Example

4×4 Diagonal DFT Calculation

The steps above are illustrated for the 4×4 example. Consider the general complex data vector of (74):

$$f^n = (z^1, z^2, z^3, z^4). \qquad (118)$$

The inverse similarity transform of (108) times the data vector (118) is given by $$f^{m'} = \overset{-1}{\overset{m'}{S}}_m f^m = \frac{1}{4} \begin{pmatrix} z_1 + z_2 - z_3 + z_4 \\ -z_1 + z_2 + z_3 + z_4 \\ z_1 - z_2 + 3z_3 - z_4 \\ 2(-z_2 + z_4) \end{pmatrix}, \qquad (119)$$

and then from (94):

$$\underset{m'}{\sigma} = (1, -1, 1, -i). \qquad (120)$$

The DFT in the transformed basis follows by multiplication of the eigenvalues in (120) with the $f^{m'}$ components in (119) to give the Fourier transform in the diagonal basis:

$$F^{m'} = \underset{m'}{\sigma} \cdot f^m = \frac{1}{4} \begin{pmatrix} z_1 + z_2 - z_3 + z_4 \\ z_1 - z_2 - z_3 - z_4 \\ z_1 - z_2 + 3z_3 - z_4 \\ -2i(-z_2 + z_4) \end{pmatrix}. \qquad (121)$$

Finally, we back-transform the $F^{m'}$ components in (121) by multiplying with the similarity transformation of (108) to give the DFT result in the original non-diagonal basis:

$$F^m = S^m_{m'} F^{m'} \qquad (122)$$

$$= \begin{pmatrix} 2 & -1 & 1 & 0 \\ 1 & 1 & 0 & -1 \\ 0 & 1 & 1 & 0 \\ 1 & 1 & 0 & 1 \end{pmatrix} \frac{1}{4} \begin{pmatrix} z_1 + z_2 - z_3 + z_4 \\ z_1 - z_2 - z_3 - z_4 \\ z_1 - z_2 + 3z_3 - z_4 \\ -2i(-z_2 + z_4) \end{pmatrix}$$

$$= \frac{1}{2} \begin{pmatrix} z^1 + z^2 + z^3 + z^4 \\ z^1 - iz^2 - z^3 + iz^4 \\ z^1 - z^2 + z^3 - z^4 \\ z^1 + iz^2 - z^3 - iz^4 \end{pmatrix},$$

in agreement with the original DFT transform, $F^m = W_n{}^m f^n$ of (75). Similarly, the inverse transformation can be calculated in the diagonal basis as discussed above using (117).

The diagonal form of the DFT in (113) shows that the calculation can be performed, efficiently and elegantly as simply a vector product. This means that the DFT can be reduced to N multiplications of the data with the eigenvalues. But as emphasized above, this observation is only partly true, i.e., although the performance gains from the diagonal representation are indeed realized, these are offset by the computational cost of setting up the data in a transformed basis as illustrated above. But even with this in mind, certain applications spend most of the time in the forward and inverse transform part of the calculations (see FIG. 2), so the main point is to explore applications where the initial and final data transformations are needed only once, and then subsequent DFT calculations can proceed as simply N multiplications of the entries along the main diagonal. The performance gain for a single DFT calculation can then be approximately log(N) times faster. Assuming for simplicity a power of 2 for the data size ($N=2^n$), we can estimate a performance improvement for large n to be n log(2)~$10^1$, or about an order of magnitude faster than the equivalent FFT calculation, and for arbitrary frequency spacing.

Figure 3:
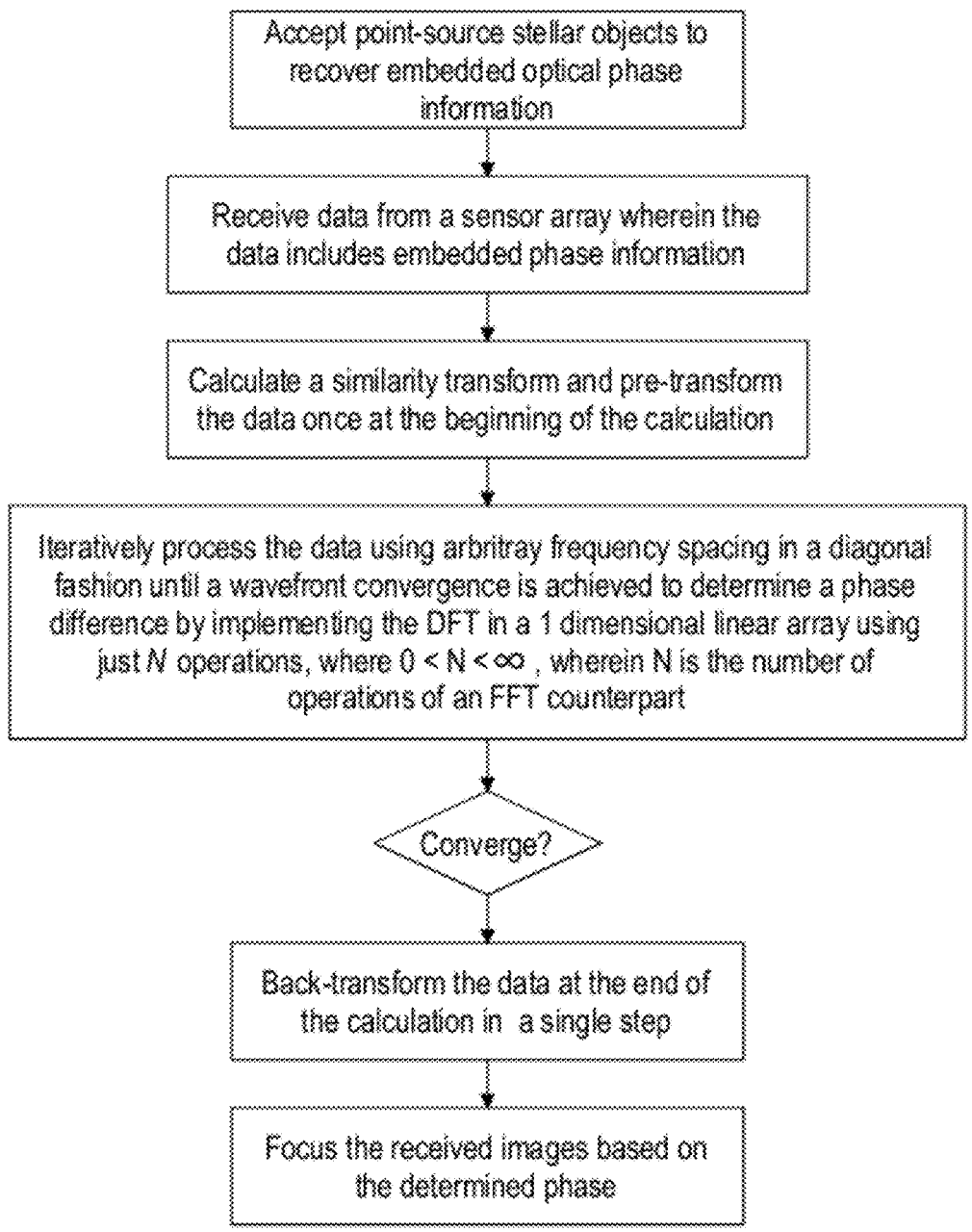
FIG. 3 is another flowchart representing the methodology of a discrete Fourier transform processor in a complex vector space, according to an example embodiment.

FIG. 3 shows an example embodiment of the present invention and is thus directed to an image-based wavefront sensing method of and means for focusing by determining phase difference between received images, removing that phase difference by calculating a DFT for each signal and iteratively multiplying the resultant until a convergence is achieved by accepting point-source stellar objects to recover embedded optical phase information, receiving data from a sensor array wherein the data includes embedded phase information, calculating a similarity transform and pre-transforming the data once at the beginning of the calculation.

FIG. 3 further shows, in an example embodiment of the present invention, an image-based wavefront sensing method of and means for iteratively processing the data using arbitrary frequency spacing in a diagonal fashion until a wavefront convergence is achieved to determine a phase difference by implementing the DFT in a 1 dimensional linear array using just N operations, where $0<N<N\times\log(N)<\infty$, wherein $N\times\log(N)$ is the number of operations of an FFT counterpart, back-transforming the data at the end of the calculation in a single step and focusing the received images based on the determined phase.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. An image-based wavefront sensing method in a space based interstellar observatory with mirror segments of focusing by determining phase difference between received images, removing that phase difference by calculating a discrete Fourier transform (DFT) to produce a series of resultants for a plurality of signals corresponding to received images and iteratively multiplying the resultants with previous iterative resultants of each signal until a convergence is achieved comprising the steps of:
   providing a space based interstellar observatory with mirror segments;
   accepting point-source images to recover embedded phase information by said space based interstellar observatory;
   receiving data from an external sensor array wherein the data includes embedded phase information;

pre-calculating a similarity transform based on orthonormal eigenvectors as columns;

pre-calculating a multiplication of the pre-calculated similarity transform with the data to minimize calculation time and processor hardware;

iteratively processing the data in a diagonal fashion to determine a phase difference by implementing the DFT in a 1 dimensional linear array using just N operations, where $0<N<N\times\log(N)<\infty$, wherein $N\times\log(N)$ is the number of operations of an FFT counterpart;

back-transforming the data at the end of the calculation in a single step;

minimizing pretransforming and back-transforming data operations;

focusing the received images based on the determined phase difference; and iteratively realigning the mirror segments to minimize focusing error effects.

2. The wavefront sensing method of claim 1 wherein calculating a similarity transform further includes pre-transforming the data once at the beginning of the calculation.

3. The wavefront sensing method of claim 2 wherein iteratively processing further includes a single step of back-transforming the data at the end of the calculation.

4. The wavefront sensing method of claim 3 wherein said point source images include stellar objects.

5. The wavefront sensing method of claim 4 wherein said embedded phase information is of an optical nature.

6. The wavefront sensing method of claim 5 wherein said external source includes a sensor array.

7. The wavefront sensing method of claim 6 wherein the step of iteratively processing further includes the step of determining the phase difference by utilizing a discrete Fourier transform (DFT).

8. The wavefront sensing method of claim 7 including iteratively processing using arbitrary frequency spacing.

* * * * *